(12) United States Patent
Petkov

(10) Patent No.: US 10,699,837 B2
(45) Date of Patent: Jun. 30, 2020

(54) PCB INDUCTIVE COUPLING FOR TORQUE MONITORING SYSTEM

(71) Applicant: FUTEK Advanced Sensor Technology, Irvine, CA (US)

(72) Inventor: Georgi Petrov Petkov, Aliso Viejo, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 123 days.

(21) Appl. No.: 15/968,371

(22) Filed: May 1, 2018

(65) Prior Publication Data

US 2019/0341183 A1 Nov. 7, 2019

(51) Int. Cl.
| | |
|---|---|
| H01F 27/24 | (2006.01) |
| H02J 50/10 | (2016.01) |
| G01L 3/10 | (2006.01) |
| H01F 27/28 | (2006.01) |
| H01F 38/14 | (2006.01) |

(52) U.S. Cl.
CPC ............ *H01F 27/24* (2013.01); *G01L 3/105* (2013.01); *H01F 27/2804* (2013.01); *H01F 38/14* (2013.01); *H02J 50/10* (2016.02)

(58) Field of Classification Search
CPC  H01F 27/24; H01F 38/14; H02J 50/10; H02J 5/005; H02J 7/025
USPC ......................................................... 307/104
See application file for complete search history.

(56) References Cited

U.S. PATENT DOCUMENTS

| | | | |
|---|---|---|---|
| 6,278,210 B1 | 8/2001 | Fatula, Jr. et al. | |
| 6,540,032 B1 | 4/2003 | Krueger | |
| 8,674,550 B2 | 3/2014 | Bohori et al. | |
| 9,199,516 B2 | 12/2015 | Jansen | |
| 2002/0135541 A1 | 9/2002 | Kowalewski | |
| 2015/0145341 A1* | 5/2015 | Chiyo | H01F 27/38 307/104 |
| 2016/0043569 A1* | 2/2016 | Dally | H01F 27/24 307/104 |
| 2016/0322857 A1* | 11/2016 | Itagaki | H01F 27/2804 |
| 2016/0344195 A1* | 11/2016 | Xu | H02J 5/005 |
| 2016/0352148 A1* | 12/2016 | Ichikawa | G01L 3/101 |
| 2017/0001003 A1* | 1/2017 | Pivonka | A61N 1/36071 |
| 2017/0092409 A1* | 3/2017 | Graham | H01F 27/24 |
| 2017/0201125 A1* | 7/2017 | You | H02J 50/10 |
| 2017/0326991 A1* | 11/2017 | Budhia | H02J 50/12 |
| 2018/0058969 A1* | 3/2018 | Mokhbery | G01L 3/108 |
| 2018/0062441 A1* | 3/2018 | Maniktala | H01F 27/24 |

FOREIGN PATENT DOCUMENTS

CN             201287404 Y     8/2009

\* cited by examiner

*Primary Examiner* — Alfonso Perez Borroto
(74) *Attorney, Agent, or Firm* — Young Basile Hanlon & MacFarlane, P.C.

(57) ABSTRACT

An inductive power transfer system for the shaft mounted electronics of a rotary torque signal generating system includes a pair of planar PCB inductors formed by spiral copper traces on the planar surfaces of one or more layers of PCB substrate material. A primary inductor comprising a copper trace on a planar PCB substrate surrounds but is not connected to a steel torque transmission shaft. A secondary PCB trace inductor on another planar substrate is mounted for rotation with the shaft and in coaxial relation with both the shaft and primary inductor substrate so as to be inductively linked therewith.

7 Claims, 3 Drawing Sheets

$$L_{mw} = K_1 \mu_0 \frac{n^2 d_{avg}}{1 + K_2 \rho}$$

PCB INDUCTIVE COUPLING FOR TORQUE MONITORING SYSTEM

FIELD OF THE INVENTION

This invention is in the field of systems for delivering torque to a load through a rotatable shaft or the like and, more particularly, to the manner in which an inductive power delivery system to the shaft mounted electronics is accomplished.

BACKGROUND

Non-contact rotary torque sensors can deliver power to the electronics carried by a rotatable shaft or the like through the use of inductive technology.

Currently the conventional wisdom for inductive power transfer is a wire-wound concentric transformer consisting of toroidal copper wire-wound coils on a ferrite core.

There are a number of disadvantages to such inductive power transfer systems. In particular, the cores and windings are usually not available "off the shelf" but must be custom designed and built. The cost of custom building ferrite cores is very high. The manufacture of copper wire windings adds additional costs and delivery time delays.

SUMMARY OF THE INVENTION

In accordance with the present invention the need for wound copper wire coils and ferrite cores is eliminated in favor of the use of coaxial and parallel printed circuit boards plated with conductive spirals. One such PCB inductor or "coil" is mounted in surrounding and coaxial relationship to a torque transmission shaft but does not rotate therewith; i.e., it is anchored to the housing to operate as a stator or "primary" winding. The other PCB is mounted coaxially on the shaft and is rotatable therewith in parallel and close proximity to the primary PCB inductor. Both PCBs can be single or multi-level, the latter being accomplished in a stratified structure with conductive traces in spiral form on the faces of the several laminated layers connected or "stitched" together by means of plated through holes. The rotatable secondary inductor is connected through appropriate electronics including a rectifier and a signal conditioning circuit to the shaft mounted electronics.

Exemplary shaft mounted electronics as well as a wireless, non-contacting data signal transfer system are fully described in the co-pending application, U.S. patent application Ser. No. 15/968,328 filed concurrently herewith by the Applicant herein and the contents of that application are incorporated herein by reference as if set forth in full.

With the two PCB inductive traces mounted in coaxial, parallel; i.e., side-by-side relationship and coaxial with the toque transmitting shaft, the shaft itself can function in part as the magnetic core. The shaft may, for example, be made of stainless steel.

In a preferred embodiment hereinafter described in detail, the sensor shaft is made of 17-4 stainless steel which exhibits low permeability and behavior close to soft magnetic materials. The spiral tracings on the PCB substrates are formed by copper in the form of an Archimedean spiral as well as multiple such spirals on laminated PCB substrate layers connected in series as further described in detail hereinafter. The PCB substrates can be FR4 or polyamide or any other suitable material with a center hole which is of sufficient dimension as to accommodate the shaft therethrough. The trace inductance is a function of number of turns in the spirals and the trace geometry. The preferred geometry of each trace is an Archimedean spiral with an inner diameter dictated by the sensor shaft diameter and an outer diameter dictated by the housing dimensions. Inductance can be appropriately adjusted through the selection of the number of turns which can be achieved by increasing or decreasing the spiral trace gap and by using a multi-layer PCB approach as hereinafter described. Inductances can be estimated as using the formula shown in FIG. 3 where $K_1$ and $K_2$ are lay out dependent, $\mu_0$ is permeability of free space, $d_{avg}$ is average diameter and p is fill ratio.

The exercitation signal applied to the primary coil in a specific example is a 200 KHz square wave with a 50% duty cycle and no zero component; i.e., the square way switches between equal plus and minus voltages and has no zero-voltage component.

DETAILED DESCRIPTION OF THE ILLUSTRATIVE EMBODIMENT

Figure 1:
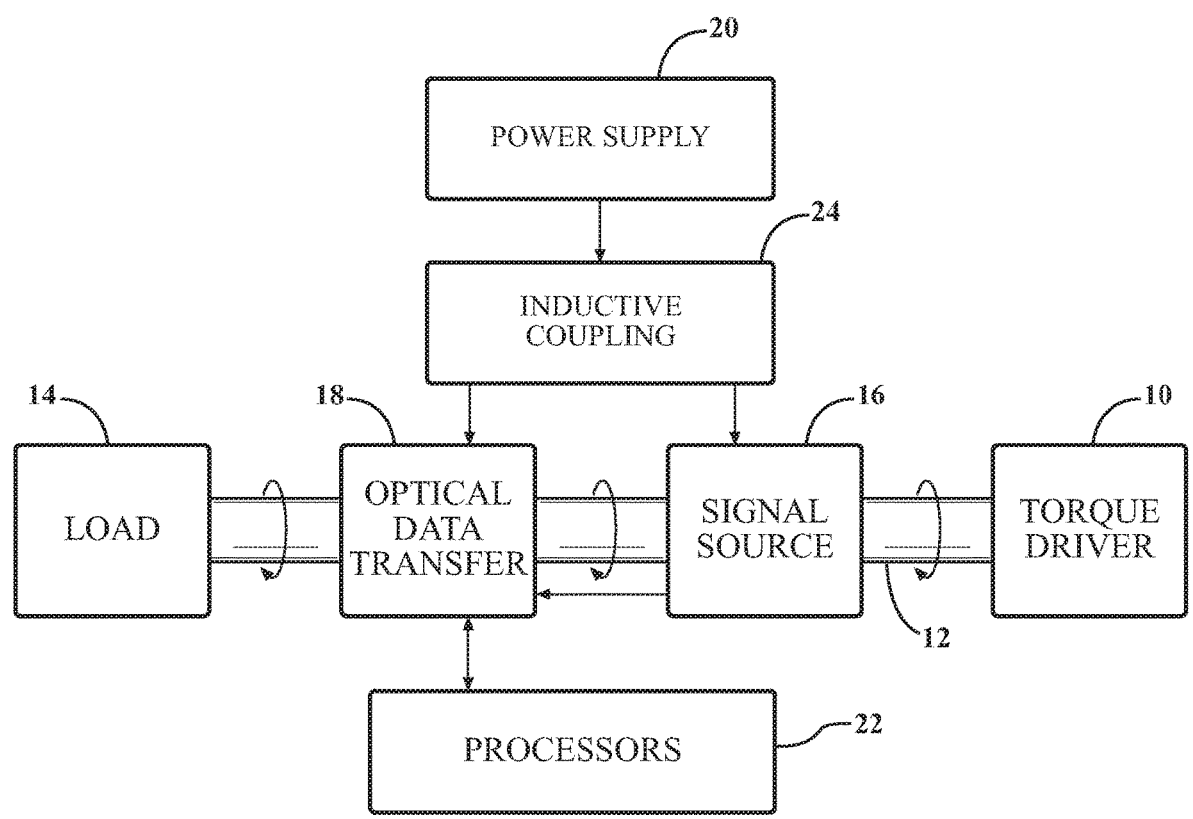
FIG. 1 is a block diagram of an overall system including an inductive coupling for power transfer.

Referring to FIG. 1 there is shown a torque driver 10 connected to deliver torque through a shaft 12 of 17-4 stainless steel to a load device 14. The diagram is intended to represent torque transmissions generically and may, by way of example, include a motor test stand, a power or hand tool for threaded fasteners, a torque calibration system, a nut runner and a variety of other devices. Mounted on the shaft 12 is a torque signal source 16 such as a set of foil-type strain gage resistors bonded to the shaft in a flexure zone and connected into a Wheatstone bridge circuit. This technology is well known to produce a DC voltage representing torque.

The torque signal source 16 is connected electronically to an optical data transfer system 18 also described in greater detail in the afore mentioned co-pending application, to wirelessly transfer torque data to housing-mounted processors 22.

An AC power supply 20 is shown connected to an inductive coupling system 24 hereinafter described in greater detail to provide power to the electronics involved in the blocks 16 and 18.

Figure 2:
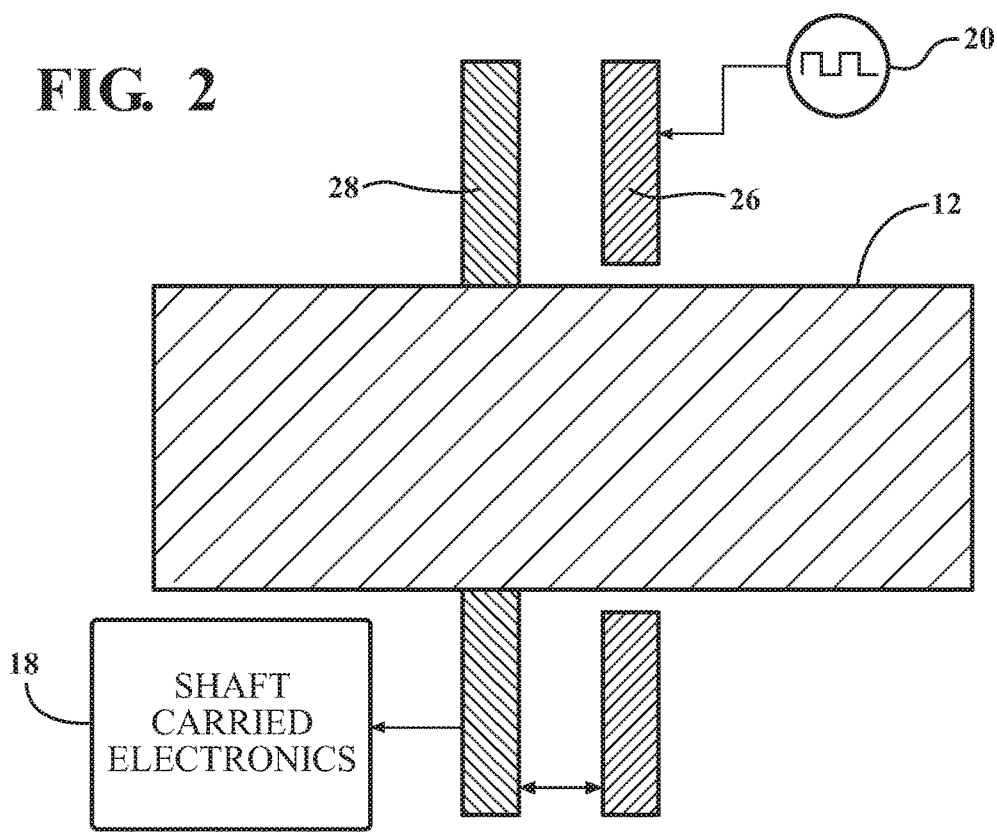
FIG. 2 is a schematic diagram of the trace windings associated with a torque transmitting shaft and showing both the primary inductor exercitation source and the utilization electronic connected through appropriate rectification and signal amplitude control electronics.

Referring now to the remaining figures, the inductive couplings 24 will be described in detail. FIG. 2 shows PCB planar inductors 26 and 28 mounted in coaxial relationship to the shaft 12 as well as in close parallel relationship to one another. PCB primary inductor 26 is stationary and may be anchored to the shaft housing. It is connected to receive a 200 KHz square wave excitation signal from source 20.

Adjacent the primary inductor PCB 26 is a secondary PCB inductor 28 the specific structure of which is hereinafter described. That inductor has an output connected to the shaft carried electronics 18 as previously described. The axial gap between the inductors is preferably small; i.e., on the order of 1-2 mm. The shaft may help to inductively link the two inductors 26 and 28, although the permeability of 17-4 stainless is small at the frequency involved.

Figure 3:
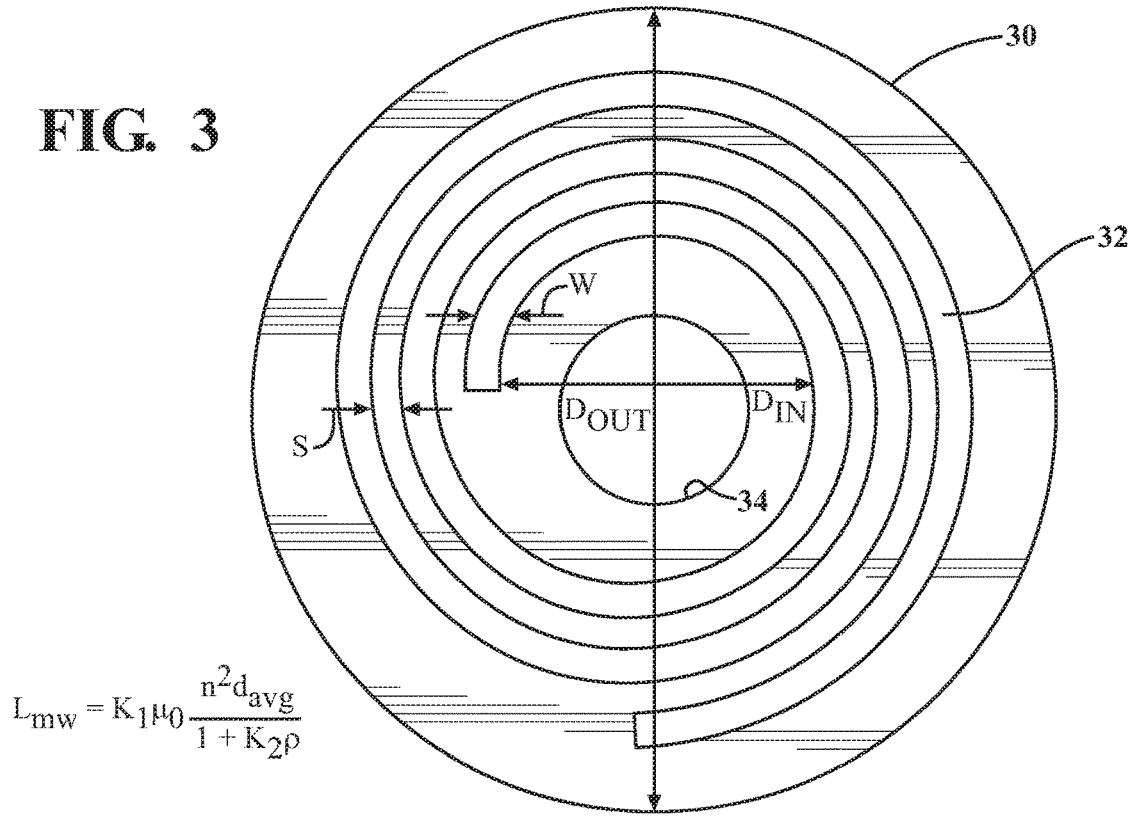
FIG. 3 is plan view of a PCB substrate with a single Archimedean spiral tracing plated thereon.
Figure 4:
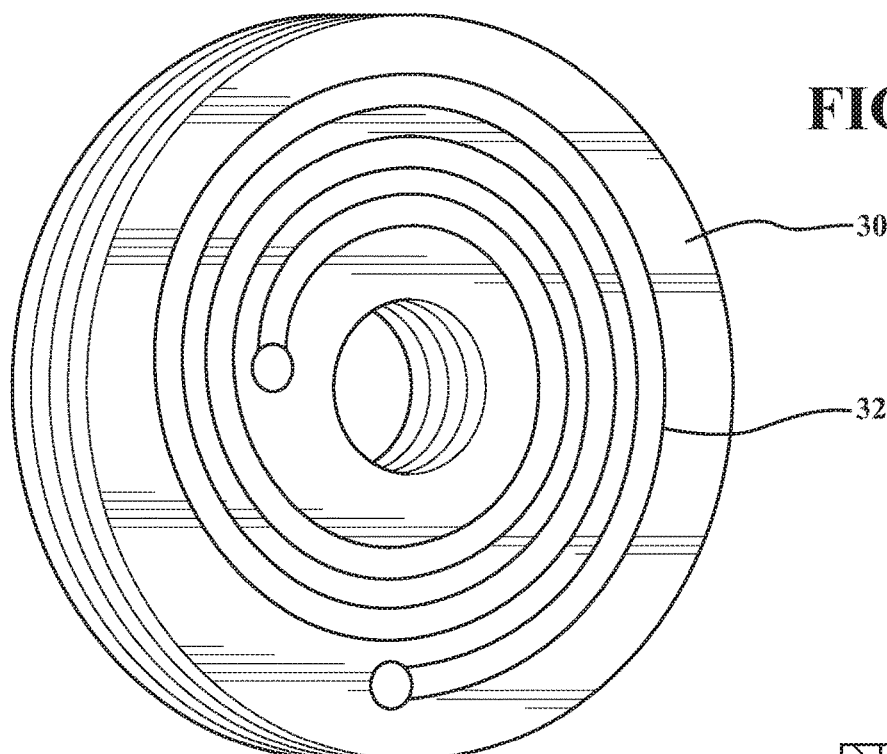
FIG. 4 is a perspective view of a multi-layer PCB spiral trace system using the Archimedean spiral trace geometry.
Figure 5:
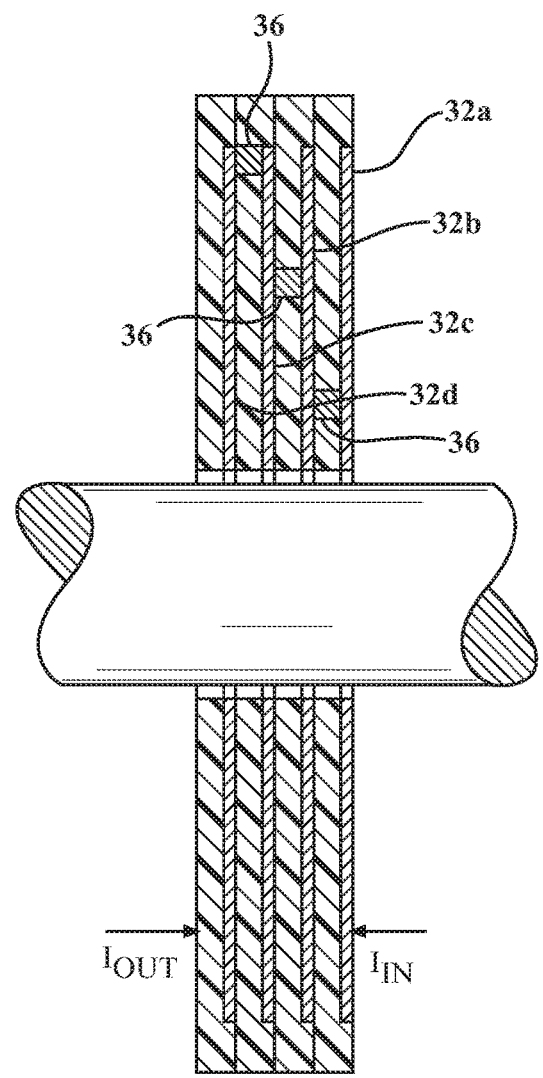
FIG. 5 is a sectional view of the multi-layer PCB tracing shown in this case as the primary inductor mounted in coaxial relationship to the torque transmitting shaft 12.

Referring now to FIGS. 3, 4, and 5, a PCB substrate 30 having a center hole 34 and being manufactured in circular form is shown to have Archimedean spiral copper trace 32 formed on one of the two planar surfaces thereof. The spiral begins near the center hole 34 and winds outwardly in increasing radial dimension until it reaches a point closer to the outer perimeter of the PCB 30.

As shown in FIG. 4 the PCB may be constructed in multiple parallel layers, all of which are made of FR4 or polyamide and bonded together by suitable mechanical or adhesive means.

As shown in FIG. 5 each of the layers of the PCB substrate has an Archimedean spiral trace 32*a*, 32*b*, 32*c* and 32*d* formed on a face thereof and the spiral traces are stitched together by means of plated through holes 36 so that they form a serial winding having the desired number of turns and inductance. The excitation current $I_{in}$ is connected to the inductor at trace 32*a* and runs serially through the traces 32*b*, 32*c*, and 32*d*.

The two PCB inductors 26 and 28 are linked together inductively to supply power to the system electronics 16, 18 as previously described. In an illustrative example involving continuous sensor sampling and data streaming, the shaft mounted electronics require on average about 120 mW (20 mA@ 6 volts) most of which is devoted to sensor excitation. Peak power is about 150 mW. The stationary electronics use on average about 550 mW. The overall system power consumption is about 1.25 watt. The transformer efficiency is about 50% to 60% with an axial spacing between inductors of about 1.5 mm; the coils should be as close as possible to improve coupling.

There are substantial advantages to the invention as described herein including lower cost and more rapid availability to the manufacturing process. While the invention has been disclosed with reference to a specific embodiment, it is to be understood that various aspects thereof such as the construction of the torque transmitting member, the shape of the PCBs, the geometry of the printed inductor traces, and other aspects are subject to modification based on specific system objectives without departing from the spirit and scope of the invention.

What is claimed:

1. In a torque monitoring system having a torque transmission shaft, a torque driver and shaft mounted electronics for generating data signals representing torque transmitted through said shaft and requiring electric power, an inductive power transfer system comprising:
    an alternating current source;
    a first PCB having a first flat conductive spiral trace thereon mounted in stationary coaxial relationship to said shaft and connected to receive the output of the alternating current source;
    a second PCB having a second flat conductive spiral trace thereon mounted rotatable coaxial relationship with and to said shaft and in parallel coaxial proximity to said first PCB and inductively coupled therewith wherein the flux formed by said inductive coupling passes in part through said shaft; said shaft mounted electronics comprising a torque signal generator secured to said shaft and a wireless signal transfer device connected to receive torque signals and transmit same wirelessly to a receiver/processor off of said shaft; and
    said second spiral trace being connected to supply power to said shaft mounted electronics.

2. The torque monitoring system described in claim 1 wherein the frequency of the alternating current source is about 200 KHz and is a square wave having no zero-voltage current state.

3. The torque monitoring system as defined in claim 1 wherein the axial spacing between said first and second PCB is about 1 to 2 mm.

4. The torque monitoring system as defined in claim 1 wherein the shaft is made of stainless steel.

5. The torque monitoring system as defined in claim 1 wherein at least one of the first and second PCB's is a multi-layer substrate structure wherein each layer of the multi-layer structure has a copper spiral trace plated thereon, the spiral traces between layers being electrically interconnected through said substrates to form a multi-turn inductor.

6. A torque monitoring system as defined in claim 1 wherein the alternating current source produces a square wave output.

7. A torque monitoring system as defined in claim 1 wherein said wireless signal transfer is accomplished optically.

* * * * *